United States Patent [19]

Nordberg

[11] Patent Number: 4,560,924
[45] Date of Patent: Dec. 24, 1985

[54] FLATNESS MEASURING APPARATUS

[75] Inventor: Robert B. Nordberg, Minneapolis, Minn.

[73] Assignee: Magnetic Peripherals Inc., Minneapolis, Minn.

[21] Appl. No.: 516,828

[22] Filed: Jul. 22, 1983

[51] Int. Cl.[4] ............................................. G01R 27/26
[52] U.S. Cl. ..................................... 324/61 R; 73/105
[58] Field of Search .............. 324/61 R, 61 P; 73/104, 73/105

[56] References Cited

U.S. PATENT DOCUMENTS

| 3,187,253 | 6/1965 | Whitmore | 324/61 |
|---|---|---|---|
| 3,254,530 | 6/1966 | Ohringer | 73/105 |
| 3,278,843 | 10/1966 | Deming | 324/61 |
| 3,287,637 | 11/1966 | Keller | 324/62 |
| 3,566,222 | 10/1969 | Close | 324/61 R X |
| 3,671,857 | 6/1972 | Bergmanis et al. | 324/61 QS |
| 3,679,972 | 7/1972 | Michelson | 324/61 R |
| 3,990,005 | 11/1976 | Abbe et al. | 324/61 R |
| 4,297,634 | 10/1981 | Ogasawara et al. | 324/61 R |
| 4,339,709 | 7/1982 | Brihier | 324/61 R |

OTHER PUBLICATIONS

Ade Corporation Instruction Manual for Microsense 3046A, pp. 1—1 and 3-1 to 3-7.

Primary Examiner—Stanley T. Krawczewicz
Assistant Examiner—Jack B. Harvey
Attorney, Agent, or Firm—Frederick W. Niebuhr; Joseph A. Genovese

[57] ABSTRACT

An elongated carriage has a first capacitive probe disposed from its top surface opposite to an object surface, and a second capacitive probe disposed from its bottom surface opposite to a level reference surface. An arm is orthogonally disposed from the elongated carriage member to provide lateral support. The carriage is moveably supported at opposite ends of the elongated member and at the distal end of the arm by three rolling members which roll in corresponding grooves of supporting members as the carriage is moved in lateral increments with respect to the stationary object and reference surfaces. The first capacitive probe and the object surface comprise a first capacitor, and the second capacitive probe and the reference surface comprise a second capacitor. As the carriage moves laterally, the first probe is moved across the object surface while the second probe is moved across the reference surface. The capacitance of each probe is translated into a distance measurement. The distance values derived from the first capacitor are utilized with the distance values derived from the second capacitor to generate numerical information describing the flatness of the object surface. The apparatus self-corrects for any translational deviations of the carriage.

18 Claims, 8 Drawing Figures

U.S. Patent Dec. 24, 1985 Sheet 2 of 2 4,560,924
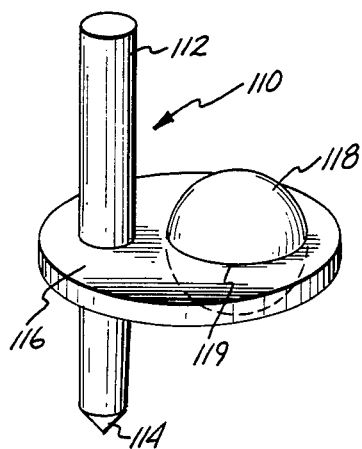
Fig.4A
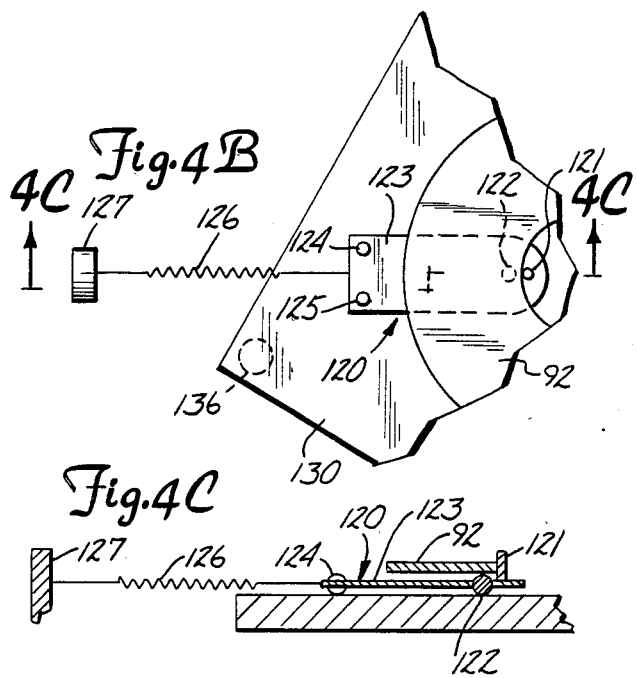
Fig.4B
Fig.4C
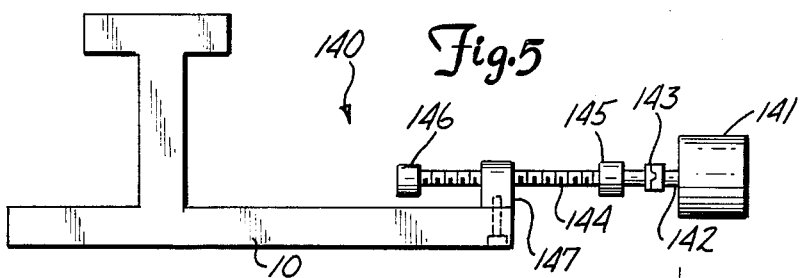
Fig.5
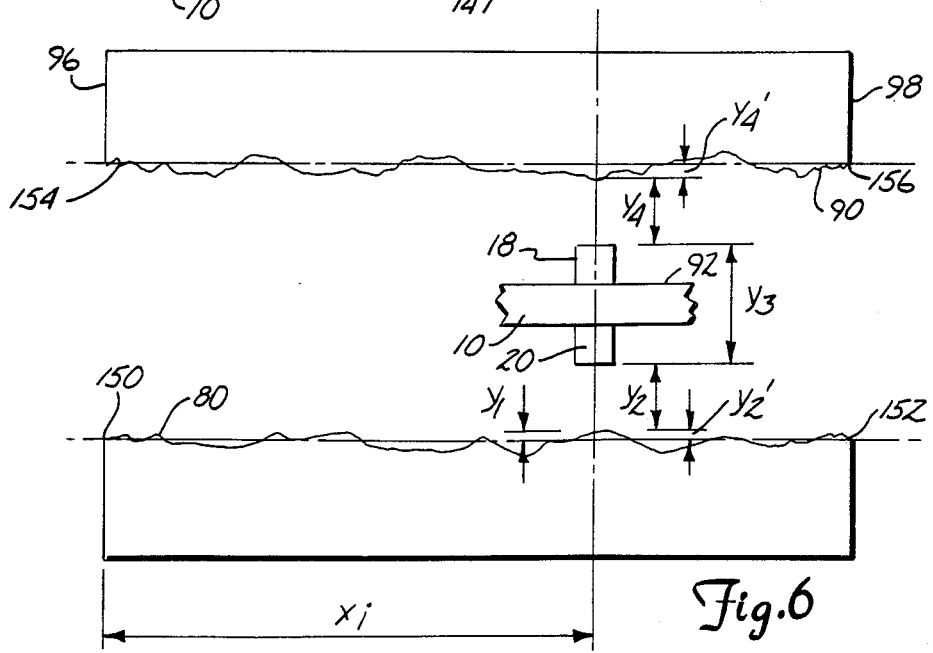
Fig.6

FLATNESS MEASURING APPARATUS

BACKGROUND

The invention relates to measuring instruments and particularly comprises an apparatus for measuring the flatness of an object.

In the past, profilometers having a stylus which rides on the surface of the magnetic disk have principally been used to measure disk flatness. For example, the Hommel T-20 profile Tester, as well as the DEKTAK II, Federal and Clevite profilometers have been used for this purpose. The use of such profilometers is undesirable, however, in that they disturb the surface of the disk. Moreover, deviations from straight line movements of the stylus caused, for example, by bearing wear or misalignment are interpreted as being the result of disk surface variations.

The invention avoids the problems of the prior art profilometer structures by employing a measuring technique for measuring the flatness of objects which self-corrects for translational deviations. The invention, moreover, is not limited to use with profilometer type styluses and in the preferred embodiment uses a pair of diametrically opposed capacitive probes. While capacitive measuring has been used in various applications as is shown by reference to U.S. Pat. Nos. 4,339,907; 4,297,634; 3,679,972; 3,671,857; 3,287,637; 3,278,843; 3,187,253, it has not heretofore been employed to measure the flatness of objects in the configuration of the present invention.

SUMMARY

The invention comprises a carriage carrying oppositely disposed capacitive probes which move across a flat reference surface and an object surface, respectively, as the carriage is moved in lateral increments. The capacitance between one of the probes and the object surface comprises one capacitor, while the capacitance between the other probe and the reference surface comprises a second capacitor. The capacitive values of the two capacitors are translated into distance values which are utilized together to generate numerical information describing the flatness of the object surface. The apparatus self-corrects for any errors which would be caused by failure to translate the probes in a straight and level line due to eccentricity of the supporting rollers or other cause.

It is therefore an object of the present invention to provide an improved flatness measuring device.

It is another object to provide a flatness measuring device for measuring the flatness of magnetic disks.

It is yet another object of the present invention to provide a flatness measuring apparatus which employs capacitive measuring techniques.

Yet another object is to provide a flatness measuring device which self-corrects for errors in translation which cause the probes to deviate from a straight and level path.

Still another object is to provide a flatness meaauring apparatus which measures the flatness of an object surface against the flat reference surface.

Still another object is to provide a flatness measuring apparatus wherein capacitive probes are moved across an object surface and a reference surface to generate distance values which can be utilized together as the carriage is moved in lateral increments to generate a numerical representation of the flatness of the object surface.

These and other objects, advantages, and novel features of the invention will become apparent from the following detailed description of the invention taken into conjunction with the accompanying drawings.

BRIEF DESCRIPTION OF THE DRAWINGS

FIG. 4A shows a perspective view of the ball-pin assembly 110 of the present invention.

FIG. 4B shows a plan view of the ball-pin assembly 120 of the present invention.

FIG. 4C shows an elevational, cross-sectional view of ball-pin assembly 120 taken along line 4C—4C of FIG. 4B.

FIG. 5 shows a plan view of the stepper motor/lead screw carriage translation mechanism 140.

FIG. 6 is a diagramatic, elevational view demonstrating the self-correcting feature of the invention.

DESCRIPTION OF PRESENTLY PREFERRED EMBODIMENT

Figure 1:
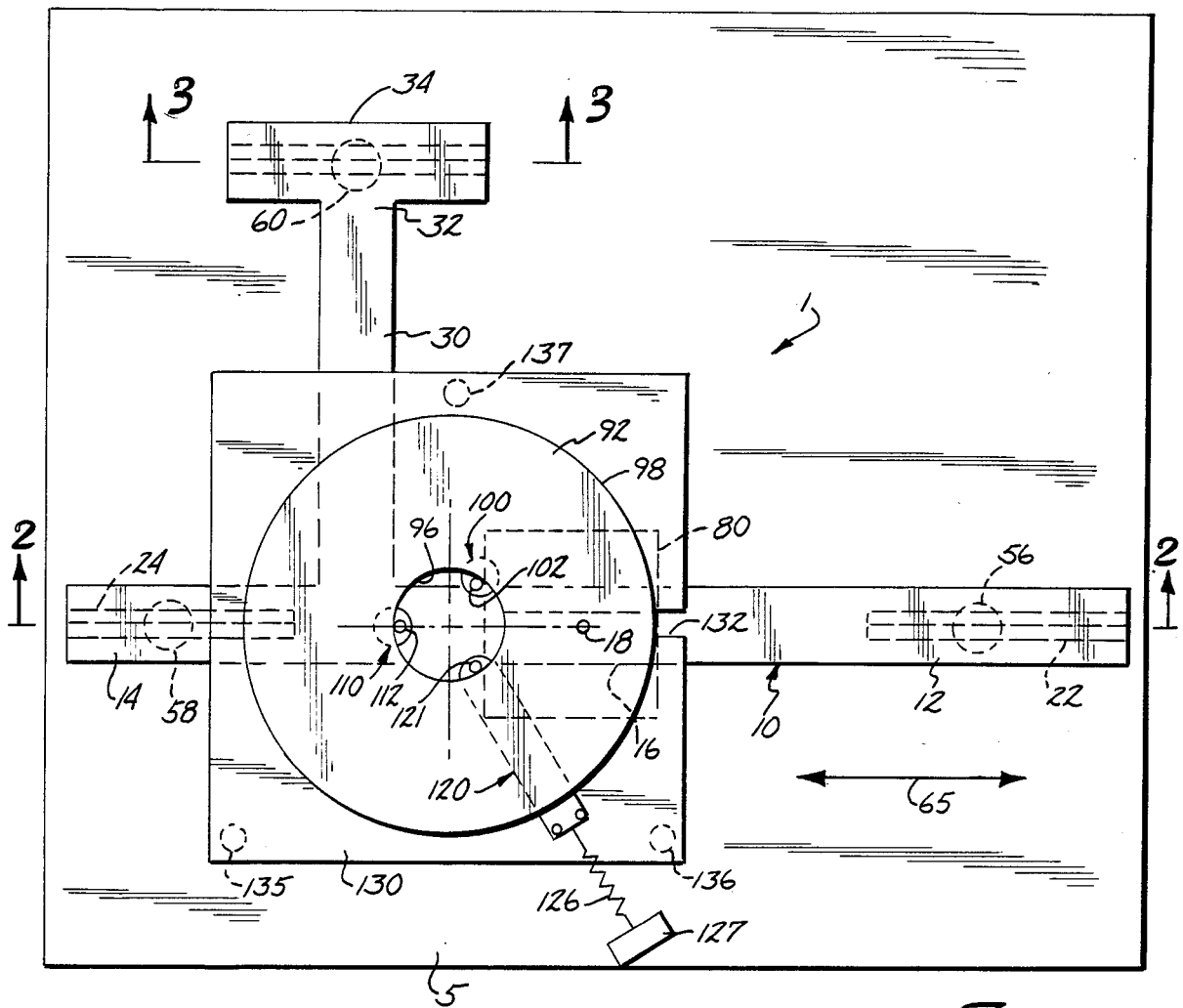
FIG. 1 shows a plan view of the invention.
Figure 2:
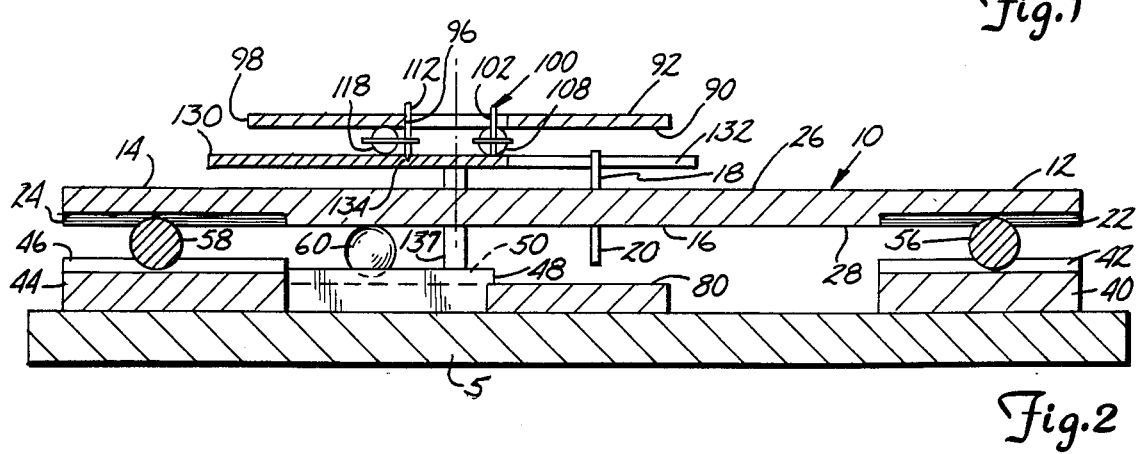
FIG. 2 shows a cross-sectional elevational view of the invention taken along line 2—2 of FIG. 1.

The apparatus 1 of the present invention, as shown in FIGS. 1 and 2, comprises a laterally moving carriage 10 carrying capacitive probes 18 and 20 which are moved laterally along an object surface 90 and a flat reference surface 80, respectively, to capacitively measure the flatness of the object surface 90. Both the object surface 90 and reference surface 80 are stationary and are supported directly or indirectly by a base 5. The carriage is moved in lateral increments with respect to base 5 as will be described later.

Carriage 10 has a first end 12, a second end 14, and a central portion 16 disposed therebetween. Carriage 10 has a first capacitive member, or probe, 18 disposed upwardly from its top side 26, and a second capacitive member, or probe, 20 disposed downwardly from its bottom side 28. First end 12 includes a first recessed portion 22, and second end 14 includes a second recessed portion 24. In the preferred embodiment, the first recessed portion comprises a first groove 22 and the second recessed portion comprises a second groove 24.

Figure 3:
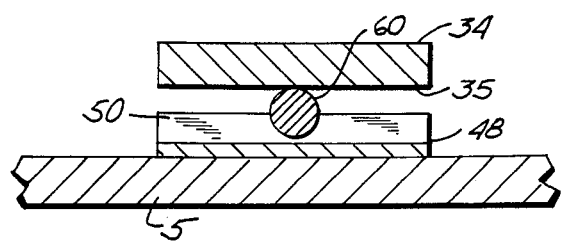
FIG. 3 shows a cross-sectional elevational view taken along line 3—3 of FIG. 1.

As best shown in FIG. 1, the apparatus 1 can include an arm 30 disposed orthogonally from the carriage 10 to provide lateral support. Arm 30 has a crosswise member 34 orthogonally disposed at its distal end 32 in a direction parallel to longated member 10. Crosswise member 34 has a flat bottom surface 35. See FIG. 3. Carriage 10 is supported by a first supporting member 40, a second supporting member 44, and a third supporting member 48. First supporting member 40 has a supporting recess 42, second supporting member 44 has a supporting recess 46, and third supporting member 48 has a supporting recess 50. In the preferred embodiment, supporting recess 42 comprises a first supporting groove 42, supporting recess 46 comprises a second supporting groove 46, and supporting recess 50 comprises a third supporting groove 50.

A first round rolling member 56 is disposed between first supporting groove 42 and overlying groove 22. Likewise, a second round rolling member 58 is disposed between second support groove 46 and overlying groove 24. A third round rolling member 60 is disposed between third supporting groove 50 and the overlying flat surface 35 of crosswise member 34. In the preferred embodiment, the first, second and third rolling members 56, 58 and 60 are identical, solid spheres.

Object surface 90 comprises the lower surface of a magnetic disk 92 in the presently preferred embodiment. Disk 92 is supported on a table 130 along its inside diameter 96 by three ball-pin assemblies 100, 110 and 120. Disk 92 has an outside diameter 98. Ball-pin assembly 110, which is identical to ball-pin assembly 100, is shown in greater detail in FIG. 4A. The assembly 110 includes a pin 112 having a pointed lower end 114. A disk 116 is secured about the middle portion of pin 112 as shown. Disk 116 rotatably supports a ball bearing 118 in an aperture 119. As is best shown in FIG. 2, pointed lower end 114 is rigidly secured in a conforming recess 134 in table 130, with ball bearing 118 supporting the disk 92 on table 130. The lower end (not shown) of pin 102 is likewise rigidly secured in a conforming recess (not shown) in table 130, with ball bearing 108 supporting disk 92 on table 130.

Ball-pin assembly 120 has a somewhat different structure than assemblies 100 and 110 as is shown in FIGS. 4B and 4C. The assembly 120 has a pin 121 and ball bearing 122 supported at the forward end of a support member 123. Support member 123 supports an identical pair of ball bearings 124, 125 at its rearward end. Ball bearing 122 supports member 92 on table 130. Bearing 122 is identical to ball bearings 108 and 118 and supports disk 92 on table 130. A spring 126 is secured to the rearward end of support member 123 and to a rigid post 127 which is secured to base 5. Spring 126 is in tension and biases pin 121 radially outwardly against the inside diameter 96 of disk 92.

As shown in FIG. 1, ball-pin assemblies 100, 110 and 120 are disposed at 120° intervals about the inside diameter 96 of disk 92. The pins 102, 112 and 121 of the respective assemblies 100, 110 and 120 are in contact with the inside diameter 96 of the disk 92 to secure disk 92 against lateral movement. In the present embodiment, pins 102 and 112 are rigid and stationary while pin 121 is spring loaded against the inside diameter 96. By spring loading pin 121, disks can be precisely positioned on table 130 and easily placed on or removed from table 130. Moreover any variations in the dimensions of the inside diameters of the disks is automatically accounted for by the spring biasing of pin 121.

Since the ball bearings 108, 118 and 122 are identically dimensioned, disk 92 is supported in an overlying and parallel relationship with respect to table 130. Table 130 is, in turn, supported upon base 5 by legs 135, 136 and 137. See FIG. 1. The legs 135 and 136 are vertically adjustable by any suitable high precision vertical adjustment mechanism to ensure that object surface 90 can be positioned horizontal and parallel to reference surface 80. Similarily, members 40 and 44 supporting carriage 10 are adjustable both vertically and angularily by any suitable high precision mechanical mechanism so that the probes 18 and 20 can be positioned to travel in horizontal and parallel paths with respect to object surface 90 and reference surface 80, respectively. The legs 135,136 and support members 40 and 44 are used to initially set the capacitive measuring circuitry of the invention as will later be described in more detail. Table 130 includes a slot 132 to accommodate the lateral movement of probe 18.

The carriage can be moved laterally in small increments in the direction 65 such as by means of the stepper motor/lead screw structure 140 shown in FIG. 5. A stepper motor 141 has an output drive shaft 142. A coupling 143 secures a lead screw 144 for rotation with output shaft 142. Lead screw 144 is journaled at opposite ends in bearing blocks 145, 146 which are rigidly secured to base 5. A screw bearing 147 is supported off the rearward end of carriage 10 and is threadably engaged with the lead screw 144. As the lead screw 144 is turned in rotational increments by stepper motor 141, screw bearing 147 advances the carriage 10 and probes 18,20 in lateral increments with respect to reference surface 80 and object surface 90. Other mechanisms for advancing the carriage 10 in lateral increments could, of course, also be suitable.

Rolling members 56 and 58 are adapted to roll in the respective oppositely disposed grooves 42, 22 and 46, 24, as the carriage 10 is moved laterally. Rolling member 60 rolls between the groove 50 and the flat bottom surface 35 of cross-piece 34. See FIG. 3. Cross-piece 34 is provided with a flat bottom rather than a groove to prevent the carriage 10 from being pulled against the rolling members 56, 58 or 60 should arm 30 shorten due to temperature variation or should one of the grooves be out of alignment with the others. Note that third supporting member 48 and sphere 60 are disposed at a lower height than supporting members 40, 44 and spheres 56,58 in FIG. 2 to compensate for the absence of an overlying groove for sphere 60 and to maintain the carriage 10 in a horizontal plane.

Capacitive probe 18 and object surface 90 comprise a first capacitor, while capacitive probe 20 and reference surface 80 comprise a second capacitor. As the carriage is moved in lateral increments, the capacitance of these first and second capacitors varies with the distance between the probe tips 18, 20 and the respective surfaces 90, 80. These varying capacitance values are used to measure the flatness of object surface 90 as will be explained shortly. It will be shown that translational errors, such as would be caused by random eccentricity of the rolling members 56 or 58, or by any deviations from straightness of the grooves 22, 24, 42 or 46, are automatically corrected for due to the configuration of the present invention, and hence, do not contribute errors to the measurement of object surface 90.

FIG. 6 illustrates the manner in which the apparatus 1 cancels-out, or self corrects for, errors which could be introduced where the probes 18 and 20 are not translated in a perfectly straight and horizontal line.

The flatness of object surface 90 can be determined by measuring its profile. The closer the profile of object surface 90 approaches a straight line, the closer object surface 90 approaches a flat surface.

As has been mentioned, carriage 10 is translated in precise small increments such as by means of the stepper motor/lead screw structure 140 (FIG. 5). After each incremental movement, the carriage 10 can be stopped and the two distances $Y_2$ and $Y_4$, shown in FIG. 6, can be determined as a function of the capacitance between probe 18 and surface 90, and probe 20 and surface 80, respectively. (A device such as a two probe Microsense 3046A, manufactured by the Ade Corporation, Newton, Mass., can be used to measure capacitance and to translate the capacitance values into distance values.) In FIG. 6, $Y_2$ is the distance between probe tip 20 and the surface 80, and $Y_4$ is the distance between the probe tip 18 and surface 90. In the present embodiment, using the Microsense 3046A unit, probe 18 is set by the operator to indicate a zero reading for a precise distance between probe tip 18 and object surface 90 which occurs at approximately 0.011250 inches. Likewise, probe 20 is set to indicate zero at a precise distance between probe tip 20 and reference surface 80 which also occurs at approximately 0.011250 inches. The measuring unit is set up so that if, at any given point $X_i$, probe 18 measures a distance other than the zero point (approx. 0.011250 inches) probe setting, the differential value representing the distance between the zero point probe setting and the actual probe reading at $X_i$ will be generated by the measuring unit. Accordingly, whereas FIG. 6 may suggest that the probe readings for $Y_2$ and $Y_4$ will indicate the distance between probe 20 and reference surface 80, and probe 18 and object surface 90, respectively, in the present embodiment, only the differential distances from the zero point of the probe settings are generated by the measuring unit. For clarity, therefore, in FIG. 6 the differential value corresponding to $Y_2$ at each point $X_i$ is denoted $Y_2'$, and the differential value corresponding to $Y_4$ at each point $X_i$ is denoted $Y_4'$.

In the present embodiment the differential values for $Y_2'$ and $Y_4'$ are added to one another at each incremental point $X_i$. A value $Y_1$ is also added with the sum of $Y_2'$ and $Y_4'$. The value $Y_1$ represents the distance, at any given point $X_i$, between the actual level of the reference surface 80 and an imaginary line running from the starting point 150 to the ending point 152 of reference surface 80. The magnitude of $Y_1$ for each point $X_i$ will be only a few microinches in that reference surface 80 is honed until it is extremely flat. The values for $Y_1$, at each incremental point $X_i$ are determined by taking a profilometer measurement at each point $X_i$ and then comparing it with the height of the line from 150 to 152. If, as measured by the profilometer, reference surface 80 falls either below, above, or on, line 150–152 at each incremental point $X_i$, then the appropriate value is stored for that point $X_i$.

As shown in FIG. 6, $Y_3$ is the distance between probe tips 18 and 20. Accordingly, the distance from object surface 90 to the imaginary line 150–152 is given by the sum $Y_1+Y_2+Y_3+Y_4$. As mentioned above, we actually measure only the differential values $Y_2'$ and $Y_4'$. We, in effect, substract out the zero probe setting values of approximately 0.011250 inches. Probe 20 is set at the zero setting (approx. 0.011250 inches) at the beginning and ending points 150,152 of reference surface 80 by adjustment of supporting members 40 and 44. Likewise, probe 18 is set at the zero setting (approx. 0.011250 inches) at the corresponding beginning and ending points 154, 156 of object surface 90 (i.e. at any starting point close to inside diameter 96 and any ending point close to outside diameter 98 of disk 92) by vertical adjustment of legs 135, 136. The value of $Y_3$ can be disregarded since it is a constant, and therefore, always has a differential value of zero. Therefore, to generate a numerical representation of the profile, or flatness, of object surface 90 we can measure $Y_2'$ and $Y_4'$ at each point $X_i$ and generate a "sum value" for $Y_1+Y_2'+Y_4'$ at each point $X_i$. The sum value for each point can then be stored in a microcomputer. A listing of the sum values for each point $X_i$ then comprises a numerical representation of the flatness of object surface 90.

As an example, assume that probes 18 and 20 have been translated in a precisely straight line parallel to line 150–152 at a given point $X_i$. Assume that we are looking at the point $X_i$ in FIG. 6 which shows the reference profile 80 rising above the zero point probe setting line 150–152. In the present embodiment, the $Y_1$ value for this point will be negative (since it is above line 150–152) and of a value of, for example, −0.000012 inches. Using the Ade Microsense Unit, the $Y_2'$ value will be positive (since the surface 80 is closer to probe 20 than the zero point probe setting line 150–152). Moreover, it will also be a value of 0.000012 inches since points 150 and 152 were adjusted to the zero point of the probe setting and in our example probe 20 is moving parallel to line 150–152. The $Y_4'$ value, as measured by the Microsense Unit, will also be positive (i.e., closer than the zero point line 154–156) and lets assume its value is 0.000019 inches. Consequently, our equation gives us:

$$Y_1+Y_2'+Y_4' = -0.000012+0.000012+0.000019 = +0.000019 \text{ inches.}$$

Therefore, in this example, the $Y_1$ value cancels out the $Y_2'$ value, and our reading for the surface of object surface 90 at point $X_i$ is +0.000019 inches which indicates that at point $X_i$ surface 90 has a protrusion of 0.000019 inches beyond zero point line 154–156.

To demonstrate the self-correcting feature of the invention let us now consider an example where at the point $X_i$ shown in FIG. 6, sphere 56 rolls over a dust particle in groove 42 which elevates the probes 18,20 of carriage 10 a distance of 0.000005 inches. The value of $Y_1$ is unaffected and will remain at −0.000012 inches. Probe 20, however, will move 0.000005 inches farther from reference surface 80 which will bring it to a distance of +0.000007 inches with respect to the zero point; while probe 18 will move 0.000005 inches closer to object surface 90 which will bring it to a distance of +0.000024 from the zero point. Consequently, our equation will now read:

$$Y_1+Y_2'+Y_4' = -0.000012+0.000007+0.000024 = +0.000019 \text{ inches.}$$

Hence, we get the very same value of 0.000019 inches at point $X_i$ in spite of the translational error caused by the dust particle. Consequently, where such a translational error occurs, the probes 18,20 work together to self-correct for the error since the value for one probe grows larger while the value for the other grows the very same amount smaller. Therefore, translational errors caused by dust or pits in the supporting grooves, eccentricity of the supporting spheres, or similar cause, have no effect in that the sum of $Y_1+Y_2'+Y_4'$ always truly represents the value of object surface 90 with respect to zero point line 154–156 at each point $X_i$ in spite of any translational errors.

In the embodiment described, as noted, a negative value for the sum of $Y_1+Y_2'Y_4'$ indicates a surface depression while a positive value represents a surface protrusion with respect to the zero point line 154–156. Obviously, the microcomputer can be programmed to change the sign of the sum value so that negative values indicate protrusions and positive values represent depressions, if desired.

The Microsense Unit No. 3046A has two probes, each of which is calibrated for distance to give an output of ±10 volts DC over the range selected. For example, if the range of ±100 microinches is selected, a +10 volt reading indicates the probe is 100 microinches closer to the surface than the zero point probe setting, and a reading of −10 V indicates that the probe is 100 microinches farther away from the surface than the zero point probe setting. As mentioned, for the present application, the zero voltage setting for each probe is very close to 0.11250 inches but varies slightly for each probe. The Microsense No. 3046A unit conveniently adds the readings of the two probes when the A+B mode is chosen. Consequently, where this unit is used, the microprocessor does not have to make the addition of $Y_2' + Y_4'$ but merely has to add the $Y_1$ value to the value provided by the unit to generate a profile value for the object surface.

After the measurements have been taken, the numerical listing of the sum values for the points $X_i$ can be plotted if desired, or the microcomputer could be programmed to review the sum values for all points $X_i$ to determine whether disk surface flatness specifications have been met without the necessity of plotting the profile.

Note that although in the preferred embodiment capacitive probes have been utilized, a profilometer stylus, for example, could be submitted for each probe 18 and 20 with the resultant structure still realizing the self-correcting feature of the invention. Accordingly, having disclosed the presently preferred embodiment of the invention, many modifications and variations thereof would be obvious to those in the art, and the invention, therefore, is intended to be limited only by the scope of the appended claims.

I claim:

1. An apparatus for measuring the flatness of an object surface, comprising:
   a flat reference surface, and meansfor supporting an object surface with respect to said reference surface;
   a first sensing means;
   a second sensing means;
   a carriage, supported for lateral movement with respect to said reference surface and object surface, for supporting said first and second sensing means, said carriage having first and second opposed sides, said first sensing means supported on said first side and said second sensing means supported on said second side, said first side facing said object surface and said second side facing said reference surface, whereby said lateral movement carries said first sensing means laterally across said object surface and carries said second sensing means laterally across reference surface;
   a means for providing relative movement between said carriage and said surfaces whereby said first sensing means generates information relative to said object surface and said second sensing means generates information relative to said reference surface; and
   means for utilizing said information from said first sensing means with said information from said second sensing means to generate information representative of the flatness of said objective surface.

2. The apparatus of claim 1, wherein said object surface and said reference surface are rigidly secured.

3. The apparatus of claim 2, wherein said first sensing means is a first capacitive member and said second sensing means is a second capacitive member, said first capacitive member and said object surface comprising a first capacitor, said second capacitive member and said reference surface comprising a second capacitor, and wherein said information utilizing means comprises a means for utilizing the capacitance values of said first capacitor with the capacitance values of said second capacitor as said carriage is moved laterally in order to generate information representative of the flatness of said object surface.

4. The apparatus of claim 3 wherein said carriage comprises an elongated member having a first end and a second end and a central portion disposed between said first and second ends, said first and second capacitive members being supported at said central portion of said elongated member.

5. The apparatus of claim 4, wherein said first end is supported by a first round rolling member, and said second end is supported by a second round rolling member.

6. The apparatus of claim 5, wherein said carriage includes an arm disposed from said elongated member, said arm having a distal end, said distal end of said arm being supported by a third round rolling member.

7. The apparatus of claim 6 wherein said first end of said elongated member has a first recessed portion, and said second end of said elongated member has a second recessed portion, and said distal end of said arm includes a flat bottom portion; said first rolling member being adapted for rolling within said first recessed portion as said carriage moves laterally, said second rolling member being adapted for rolling within said second recessed portion as said carriage moves laterally, and said third rolling member being adapted for rolling against said flat bottom portion as said carriage moves laterally.

8. The apparatus of claim 7 wherein said arm is disposed orthogonally from said elongated member and has a crosswise member disposed orthogonally at its distal end, said crosswise member being disposed in a direction parallel to said elongated member.

9. The apparatus of claim 8 wherein said first rolling member is supported by a supporting recess of a first supporting member, said second rolling member is supported by a supporting recess of a second supporting member, and said third rolling member is supported by a supporting recess of a third supporting member.

10. The apparatus of claim 9 wherein said first and second recessed portions of said carriage comprise first and second grooves formed into said carriage, and said first, second and third supporting recesses comprise first, second and third supporting grooves, respectively.

11. The apparatus of claim 10 wherein said first, second and third rolling members comprise first, second and third spheres.

12. The apparatus of claim 3 wherein said first capacitive member and said second capacitive member are supported on opposite sides of said elongated member and are diametrically opposed to one another.

13. The apparatus of claim 12 wherein said first capacitive member is a first capacitive probe and said second capacitive member is a second capacitive probe.

14. The apparatus of claim 5, wherein said first end of said elongated member has a first recess portion, and said second end of said elongated member has a second recess portion; said first rolling member being adapted for rolling within said first recess portion as said carriage moves laterally, and said second rolling member adapted for rolling within said second recess portion as said carriage moves laterally.

15. The apparatus of claim 14, wherein said first rolling member is supported by a supporting recess of a first supporting member, and said second rolling member is supported by a supporting recess of a second supporting member.

16. The apparatus of claim 15, wherein said first capacitive member is a first capacitive probe, and said second capacitive member is a second capacitive probe.

17. The apparatus of claim 1, including means for selectively positioning said object surface with respect to said reference surface.

18. The apparatus of claim 17, wherein said positioning means includes a table for supporting said object surface, and a plurality of adjustable legs for selectively positioning said table.

* * * * *